June 26, 1934.                 R. IRVINE                    1,964,468
                    TOOL FOR REMOVING GREASE RETAINERS
                         Filed March 22, 1934
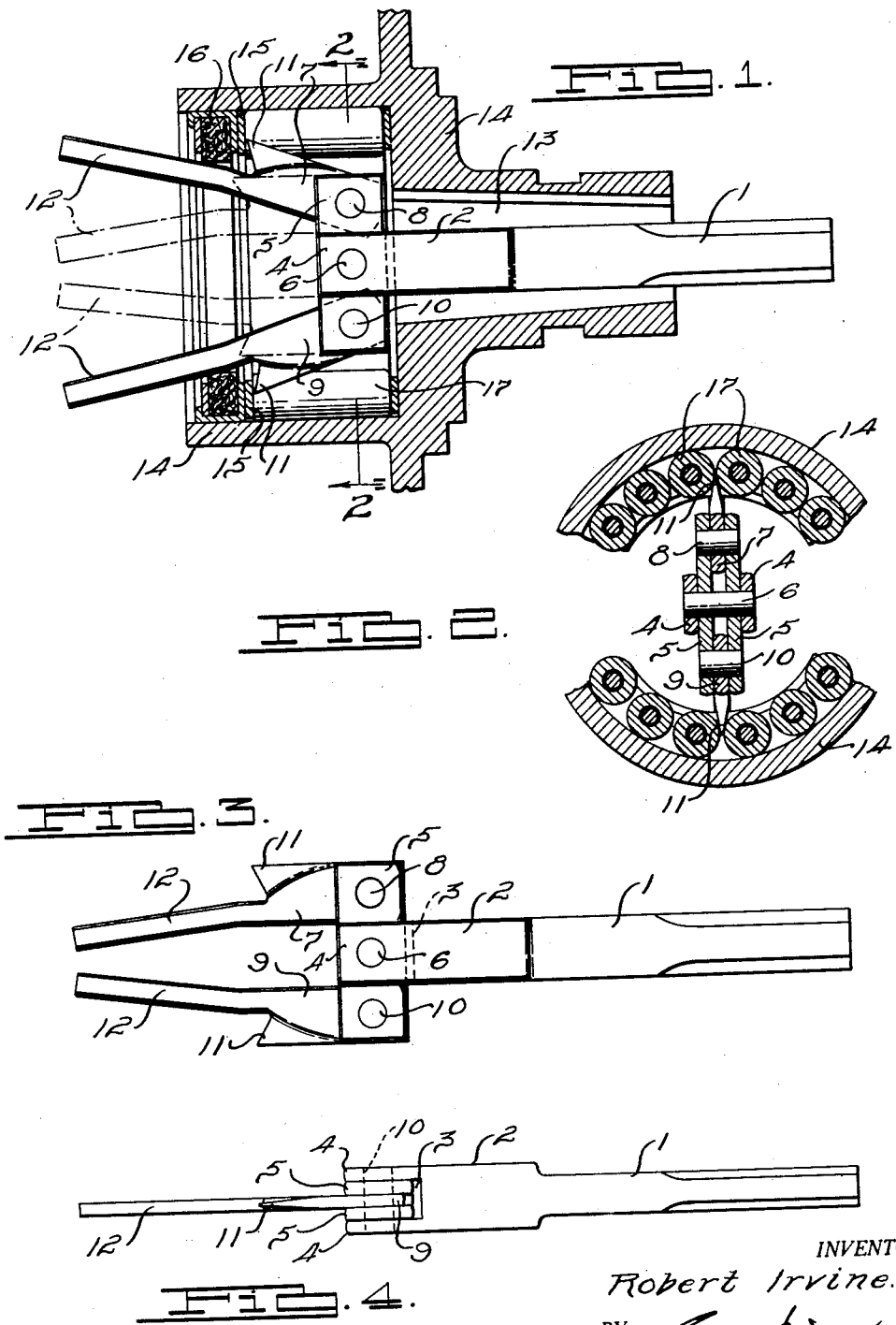
INVENTOR.
Robert Irvine.
BY
ATTORNEY.

Patented June 26, 1934

1,964,468

UNITED STATES PATENT OFFICE 1,964,468

TOOL FOR REMOVING GREASE RETAINERS

Robert Irvine, Detroit, Mich.

Application March 22, 1934, Serial No. 716,750

5 Claims. (Cl. 29—88.2)

This invention relates to tools for removing grease retainers and the object of the invention is to provide a tool particularly adapted for removing grease retainers from automobile wheel hubs.

Another object of the invention is to provide a tool which may be inserted through the wheel hub and provided with pivoted arms each having a shoulder arranged for engagement behind the grease retainer or bearing adjacent thereto and the tool being provided with an end which may be driven to force the grease retainer out of the wheel hub.

Another object of the invention is to provide a tool comprising a shank having a pair of arms pivotally mounted in relation to the shank, the said arms being adapted to be manually spread apart and each arm being provided with a shoulder the roller bearing and grease retainer.

A further object of the invention is to provide a tool having a shank and provided with a pair of arms pivotally mounted in a cross member and the cross member being pivotally mounted in the shank, the arrangement being such that the arms may be turned on their pivots and the cross member may also turn on its pivot in the shank.

These objects and the several novel features of the invention are hereinafter more fully described and claimed and the preferred form of construction by which these objects are attained is shown in the accompanying drawing in which—

Fig. 1 is a section through a wheel hub showing the tool inserted therein in position to drive out the roller bearings and grease retainer.

Fig. 2 is a section taken on line 2—2 of Fig. 1.

Fig. 3 is an elevation of the tool.

Fig. 4 is an edge view thereof.

The tool comprises a shank 1 which is provided with enlarged portions 2 at the lower end having a transverse slot 3 cut therein. This slot provides extending ends 4 on the shank as shown more particularly in Figs. 2 and 4 and a pair of metal strips 5 are inserted in the slot 3 and a rivet 6 extends through the ends 4 and strips 5. By this arrangement, the strips 5 are pivotally mounted in the end of the tool shank between the end portions 4. A member 7 is pivotally mounted at 8 between the strips 5 at one end and a similar member 9 is pivotally mounted at 10 between the strips 5 at the opposite end as shown more particularly in Figs. 2, 3 and 4. As will be noted from Fig. 2, these members 7 and 9 space the strips 5 apart and the members 7 and 9 are each provided with an extending handle 12 and with a pointed shoulder 11 on the outer side. These shoulders 11 are also tapered toward the edges, as shown in Figs. 2, 3 and 4.

In use the tool shank 1 is inserted through the aperture 13 of a wheel hub 14 until the metal strips 5 engage the bottom of the bearing recess in the hub, as shown in Fig. 1. At this time, by taking the handles 12 in the fingers, these handles may be moved apart to cause the pointed shoulders 11 to engage beneath the bearing plate 15 as shown in Figs. 1 and 2. When in this position, the wheel hub may be dropped on the floor so that the end of the tool shank 1 strikes the floor and drives out the bearing and grease retainer or, in the position shown in Fig. 1, a hammer may be utilized to pound against the end of the tool shank 1 to drive the bearing and grease retainer 16 out of the bearing recess.

The bearings in the wheel hubs usually fit quite freely but the grease retainers are usually a press fit so that they are pressed in tightly and it is almost impossible to remove the grease retainer except with a tool of this type. While I have shown the tool as utilized to remove a bearing as well as the grease retainer, it may be used just as effectively in removing the grease retainer if there is no roller bearing. It will also be noted more particularly from Fig. 2, that the pointed shoulders 11 of the members 7 and 9 are tapered or sharpened so as to readily engage between the rollers 17 of the roller bearing. If the grease retainer or bearing is not square in the recess, the yoke comprising the two arms 5 will turn on the pivot pin 6 to accommodate the points 11 to the plane of the grease retainer or bearing and this pivoting feature of the strips 5 also allows the device to be utilized in removing grease retainers which have been deformed or damaged as the pivot 6 allows the members 7 and 9 to accommodate themselves to the surface of the grease retainer or bearing plate.

From the foregoing description it becomes evident that the device is very simple and efficient in operation, will not easily get out of order, is composed of few parts and is of consequent low manufacturing cost and provides a device which accomplishes the objects described.

Having thus fully described my invention, its utility and mode of operation, what I claim and desire to secure by Letters Patent of the United States is—

1. In a tool, a tool shank having an enlarged end provided with a slot therethrough, a yoke pivotally mounted intermediate its ends in the slot and spaced from the bottom of the slot to allow limited turning movement of the yoke before engaging the bottom of the slot and a retainer engaging member pivotally mounted in each outer end of the yoke, each retainer engaging member being provided with a pointed retainer engaging shoulder.

2. In a tool, a tool shank, a pair of metal strips pivotally mounted in the end of the tool shank, a pair of retainer engaging members pivotally mounted between the opposite ends of the metal strips, each retainer engaging member having a tapered pointed shoulder on the outer side and an extending handle on the inner side by which the retainer engaging members may be turned on their pivots.

3. In a tool, a tool shank, a yoke pivotally mounted in one end of the tool shank, a retainer engaging member pivotally mounted in each end of the yoke and provided with a pointed shoulder, each retainer engaging member having an extending handle by which the member may be turned on its pivot to move the shoulders to the desired position.

4. In a tool, a tool shank, a yoke pivotally mounted in one end of the tool shank, a retainer engaging member pivotally mounted in each end of the yoke, each retainer engaging member having an extending handle by which the retainer engaging member may be turned on its pivot.

5. In a tool, a tool shank having a bifurcated end, a yoke pivotally mounted in said bifurcated end and turnable to a limited extent therein and a pair of retainer engaging members pivotally mounted in the opposite ends of the yoke.

ROBERT IRVINE.